(12) United States Patent
Pan et al.

(10) Patent No.: US 11,707,817 B2
(45) Date of Patent: Jul. 25, 2023

(54) INTEGRATED SYSTEM FOR AUTOMATIC FORMING, PICKING, AND INSPECTION OF GRINDING WHEEL MESH PIECE AND METHOD THEREFOR

(71) Applicant: JIANGSU AMER NEW MATERIAL CO., LTD., Jiangsu (CN)

(72) Inventors: Wanyu Pan, Jiangsu (CN); Junjie Zhao, Jiangsu (CN); Ming Gu, Jiangsu (CN)

(73) Assignee: JIANGSU AMER NEW MATERIAL CO., LTD., Jiangsu (CN)

( * ) Notice: Subject to any disclaimer, the term of this patent is extended or adjusted under 35 U.S.C. 154(b) by 0 days.

(21) Appl. No.: 17/636,885

(22) PCT Filed: Nov. 5, 2019

(86) PCT No.: PCT/CN2019/115680
§ 371 (c)(1),
(2) Date: Feb. 20, 2022

(87) PCT Pub. No.: WO2021/031362
PCT Pub. Date: Feb. 25, 2021

(65) Prior Publication Data
US 2022/0266423 A1 Aug. 25, 2022

(30) Foreign Application Priority Data
Aug. 21, 2019 (CN) .......................... 201910771904.7

(51) Int. Cl.
*B24D 18/00* (2006.01)
*G06T 7/00* (2017.01)
*G06T 7/80* (2017.01)

(52) U.S. Cl.
CPC .......... *B24D 18/009* (2013.01); *G06T 7/0004* (2013.01); *G06T 7/80* (2017.01);
(Continued)

(58) Field of Classification Search
CPC .................... G06T 7/0004; G06T 2207/30164
See application file for complete search history.

(56) References Cited

U.S. PATENT DOCUMENTS

| | | | |
|---|---|---|---|
| 2017/0108855 A1* | 4/2017 | Hocker | G01N 33/12 |
| 2021/0178748 A1* | 6/2021 | Jufer | B41F 9/1027 |
| 2022/0088955 A1* | 3/2022 | Dimitrijevic | B41F 9/063 |

FOREIGN PATENT DOCUMENTS

| | | |
|---|---|---|
| CN | 105329663 A | 2/2016 |
| CN | 205720017 U | 11/2016 |

(Continued)

*Primary Examiner* — Jayanti K Patel
*Assistant Examiner* — Christopher Kingsbury Glover
(74) *Attorney, Agent, or Firm* — Global IP Services; Tianhua Gu (57) ABSTRACT

An integrated system for automatic forming, picking, and inspection of a grinding wheel mesh piece and a method thereof, including a visual inspection system (1), a conveying system (2), a cutting system (3), and a picking system (4); the conveying system (2) is used to precisely control a conveying action of a cutting section conveying platform (51) and a picking section conveying platform (52), and the visual inspection system (1) is used to acquire an image of a grinding wheel mesh cloth, establish virtual origin coordinates of a cutting layout and center coordinates of the grinding wheel mesh piece after cutting, recognize defects of the grinding wheel mesh cloth, and calibrate qualified center coordinates and unqualified center coordinates; the cutting system (3) is used to cut the grinding wheel mesh cloth moved to the cutting section conveying platform (51) to obtain a circular grinding wheel mesh piece.

6 Claims, 7 Drawing Sheets

(52) U.S. Cl.
CPC ............... *G06T 2207/30124* (2013.01); *G06T 2207/30164* (2013.01)

(56) References Cited

FOREIGN PATENT DOCUMENTS

| | | |
|---|---|---|
| CN | 106925533 A | 7/2017 |
| CN | 206322007 U | 7/2017 |
| JP | HI0113817 A | 5/1998 |
| JP | 2017074640 A | 4/2017 |

* cited by examiner

Fig. 11

INTEGRATED SYSTEM FOR AUTOMATIC FORMING, PICKING, AND INSPECTION OF GRINDING WHEEL MESH PIECE AND METHOD THEREFOR

CROSS REFERENCE TO RELATED PATENT APPLICATION

The present application is the US national stage of PCT/CN2019/115680 filed on 2019 Nov. 5, which claims the priority of the Chinese patent application No. 201910771904.7 filed on 2019 Aug. 21, which application is incorporated herein by reference.

FIELD OF TECHNOLOGY

The present invention relates to a grinding wheel mesh piece production system, and in particular, to an integrated system for automatic forming, picking, and inspection of a grinding wheel mesh piece and a method for producing a mesh by using the system.

BACKGROUND

As a reinforcing substrate for a grinding wheel, a grinding wheel mesh piece is used to enhance tensile properties of the grinding wheel. In a production process, first a mesh cloth needs to be punched into circular mesh pieces, then the punched mesh pieces are picked up, and finally grinding wheel mesh pieces are inspected to screen out unqualified mesh pieces.

In a current grinding wheel mesh piece manufacturing process, there are the following problems:

(1) The punched mesh pieces are first picked up manually, which has low picking efficiency and high labor intensity. Later, corresponding automatic picking devices appear, mainly classified into a holding picking device and an adhesive adsorption picking device. For example, Patent Application No. 201010527154.8 discloses a method of picking grinding wheel reinforced mesh piece, which implements picking of a mesh piece by using a plurality of holders to synchronously hold a row of mesh pieces and place the mesh pieces on a stick subgroup. In another example, a grinding wheel mesh piece picking mechanism disclosed in Patent Application No. ZL201510714817.X adsorbs mesh pieces by means of adhesive adsorption, then transfers the mesh pieces to an acquisition stick, and then removes the mesh pieces from the adhesive by using a cylinder. The foregoing two methods greatly improve the efficiency of picking and reduce the labor intensity. However, during or after picking, the mesh pieces still need to be manually inspected for defects, the overall efficiency is still low, and the mesh pieces can only be inspected by sampling but cannot be fully inspected. It is impossible to implement real streamlined production.

SUMMARY

The present invention provides an integrated system for automatic forming, picking, and inspection of a grinding wheel mesh piece, and a method for performing high-efficient forming, picking and inspection by using the system.

To solve the foregoing technical problem, a technical solution of the present invention is as follows: An integrated system for cutting, picking and inspection of a grinding wheel mesh piece is mounted on a grinding wheel mesh piece production line, wherein the production line includes a cutting section conveying platform and a picking section conveying platform which are arranged in sequence along a conveying direction, a cutting device is mounted above the cutting section conveying platform, a picking device is mounted above the picking section conveying platform; the integrated system includes a visual inspection system, a conveying system, a cutting system, and a picking system;

the vision inspection system includes a visual inspection system industrial control computer, a vision inspection system PLC, a line scanning camera, a camera controller, an image acquisition card, an LED light source, and a light source controller, wherein the line scanning camera and the LED light source are mounted in front of the cutting section conveying platform of the grinding wheel mesh piece production line; the visual inspection system industrial control computer is provided with built-in template grid software and visual defect recognition software; the visual inspection system industrial control computer communicates with the visual inspection system PLC, a control signal output end of the visual inspection system PLC accesses the camera controller and the light source controller, the camera controller and the light source controller respectively control turn-on and turn-off of the line scanning camera and the LED light source, and the image acquisition card connected to the line scanning camera accesses the visual inspection system industrial control computer through an image transmission bus; and the conveying system includes a conveying system industrial control computer, a conveying system PLC, a cutting section conveying motor, a cutting section holding and feeding motor, a cutting section holding cylinder, a picking section conveying motor, a picking section holding and feeding motor, and a picking section holding cylinder, wherein the cutting section conveying motor, the cutting section holding and feeding motor, the picking section conveying motor, and the picking section holding and feeding motor are respectively equipped with independent servo drivers and rotary encoders; cylinder solenoid valves are disposed on control air circuits of the cutting section holding cylinder and the picking section holding cylinder; the cutting section conveying motor, the cutting section holding and feeding motor, the cutting section holding cylinder, the picking section conveying motor, the picking section holding and feeding motor, and the picking section holding cylinder are all mounted on the cutting device;

the conveying system industrial control computer communicates with the conveying system PLC, a control signal output end of the conveying system PLC accesses the servo drivers of the cutting section conveying motor, the cutting section holding and feeding motor, the picking section conveying motor, and the picking section holding and feeding motor as well as the cylinder solenoid valves of the cutting section holding cylinder and the picking section holding cylinder, wherein output signals of the rotary encoders of the cutting section conveying motor, the cutting section holding and feeding motor, the picking section conveying motor, and the picking section holding and feeding motor access the conveying system PLC; and the cutting system includes a cutting system industrial control computer, a motion controller of a multi-blade cutting system, a tool holder X-axis drive motor, a tool holder Y-axis drive motor, a tool holder Z-axis drive motor, a cutter rotary motor, a location adjustment motor, and a cutter vibration motor, wherein the tool holder X-axis drive motor, the tool holder Y-axis drive motor, the tool holder Z-axis drive motor, the cutter rotary motor, and the location adjustment motor are all equipped with independent servo drivers and rotary encoders, respectively, and the cutter vibration motor is equipped with a servo driver; the tool holder X-axis drive motor, the tool holder Y-axis drive motor, the tool holder Z-axis drive motor, the cutter rotary motor, the location adjustment motor and the cutter vibration motor are mounted on the cutting device;

the cutting system industrial control computer communicates with the motion controller of the multi-blade cutting system, a control signal output end of the motion controller of the multi-blade cutting system accesses the servo drivers of the tool holder X-axis drive motor, the tool holder Y-axis drive motor, the tool holder Z-axis drive motor, the cutter rotary motor, the location adjustment motor and the cutter vibration motor; output signals of the rotary encoders of the tool holder X-axis drive motor, the tool holder Y-axis drive motor, the tool holder Z-axis drive motor, the cutter rotary motor and the location adjustment motor access the motion controller of the multi-blade cutting system;

the picking system includes a robot picking system PLC, a first link arm drive motor, a second link arm drive motor, a third link arm drive motor, and an end effector drive cylinder, wherein the first link arm drive motor, the second link arm drive motor, and the third link arm drive motor are all equipped with servo controllers and rotary encoders, and an end effector solenoid valve is disposed on a control air circuit of the end effector driving cylinder; the first link arm drive motor, the second link arm drive motor, the third link arm drive motor, and the end effector drive cylinder are mounted on the picking device;

a control signal output end of the robot picking system PLC accesses the servo controllers of the first link arm drive motor, the second link arm drive motor, and the third link arm drive motor, as well as the end effector solenoid valve of the end effector drive cylinder; output signals of the rotary encoders of the first link arm drive motor, the second link arm drive motor, and the third link arm drive motor access the robot picking system PLC;

an output signal of the visual inspection system industrial control computer accesses the motion controller of the multi-blade cutting system and the robot picking system PLC, an output signal of the conveying system PLC accesses the visual inspection system PLC, the conveying system PLC, the motion controller of the multi-blade cutting system, and the robot picking system PLC communicate with each other.

Further, the visual inspection system further includes a roller encoder, and an output signal of the roller encoder accesses the visual inspection system PLC.

Further, the picking system further includes a stacking station switching motor equipped with a servo controller and a rotary encoder, and an output signal of the rotary encoder of the stacking station switching motor and an input signal of the servo controller of the stacking station switching motor are both connected to the robot picking system PLC.

A mesh piece production method based on the integrated system for cutting, picking and inspection of a grinding wheel mesh piece is further provided, wherein the method includes the steps as follows:

S1: a visual inspection system industrial control computer, a conveying system industrial control computer and a cutting system industrial control computer retrieve cutting pattern layout information of a grinding wheel mesh piece, wherein the cutting pattern layout information includes a width of a grinding wheel mesh cloth and an inner diameter, an outer diameter and spacing data of the grinding wheel mesh piece;

S2: the conveying system industrial control computer sends the retrieved cutting pattern layout information of the grinding wheel mesh piece to a conveying system PLC, and the conveying system PLC detects whether a conveying start signal of the conveying system industrial control computer, a cutting end signal of a motion controller of a multi-blade cutting system, and a picking end signal of a robot picking system PLC are received; if the conveying system PLC receives the conveying start signal or simultaneously receives the cutting end signal of the motion controller of the multi-blade cutting system and the picking end signal of the robot picking system PLC, the conveying system PLC selects a corresponding conveying speed, a conveying interval and a conveying location according to the received cutting pattern layout information of the grinding wheel mesh piece, and sends a corresponding control signal to servo drivers of a cutting section conveying motor, a cutting section holding and feeding motor, a picking section conveying motor, and a picking section holding and feeding motor as well as cylinder solenoid valves of a cutting section holding cylinder and a picking section holding cylinder;

the cutting section holding cylinder and the picking section holding cylinder hold a cutting section conveying belt and a picking section conveying belt, meanwhile, the cutting section conveying motor, the picking section conveying motor, the cutting section holding and feeding motor, and the picking section holding and feeding motor are driven by the corresponding servo drivers, and jointly drive the cutting section conveying belt and the picking section conveying belt to move along a conveying direction according to a set speed and an interval time to convey the grinding wheel mesh cloth or the grinding wheel mesh piece;

in addition, rotary encoders corresponding to the cutting section conveying motor, the picking section conveying motor, the cutting section holding and feeding motor, and the picking section holding and feeding motor feed back location signals to the conveying system PLC for closed-loop positioning control;

after receiving a feedback signal from the rotary encoder of the cutting section conveying motor, the conveying system PLC sends a visual inspection system startup signal to the visual inspection system PLC;

when determining that the received positioning signal is in place, the conveying system PLC sends a conveying positioning end signal to the motion controller of the multi-blade cutting system and the robot picking system PLC;

S3: the visual inspection system industrial control computer sends the retrieved cutting pattern layout information of the grinding wheel mesh piece to the visual inspection system PLC;

after receiving a start signal of a visual inspection system, the visual inspection system PLC sends a corresponding photographing control signal to a corresponding camera controller and light source controller, a line scanning camera and an LED light source are turned on to photograph an image of the grinding wheel mesh cloth, and an image acquisition card of the line scanning camera sends acquired image information to the visual inspection system industrial control computer through an image transmission bus;

after receiving the acquired image information, the visual inspection system industrial control computer generates a cutting layout and origin coordinates thereof on the grinding wheel mesh cloth at a current location, generates virtual center coordinates of a cut grinding wheel mesh piece on the cutting layout according to cutting pattern layout information of the grinding wheel mesh piece and built-in template grid software, and sends the origin coordinates to the motion controller of the multi-blade cutting system;

in addition, the visual inspection system industrial control computer performs defect recognition on the cutting layout according to built-in visual defect recognition software, then calibrates, after obtaining defect coordinates, categories of the defect coordinates, and determines the quantity of defects and categories of the defects in a grinding wheel mesh piece region corresponding to the virtual center coordinates of each grinding wheel mesh piece according to the defect coordinates; then calibrates the virtual center coordinates of each grinding wheel mesh piece as center coordinates of a qualified mesh piece or center coordinates of an unqualified mesh piece according to a determining rule of the visual defect recognition software; and sends the center coordinates of the qualified mesh piece and the center coordinates of the unqualified mesh piece to the robot picking system PLC;

S4: the cutting system industrial control computer sends the retrieved cutting pattern layout information of the grinding wheel mesh piece to the motion controller of the multi-blade cutting system;

after receiving the conveying positioning end signal, the motion controller of the multi-blade cutting system first selects a corresponding cutter parameter according to the cutting pattern layout information of the grinding wheel mesh piece, sends a corresponding control signal to servo drivers corresponding to the location adjustment motor and the cutter vibration motor, starts the location adjustment motor to adjust a distance between adjacent cutters, and controls whether each cutter corresponding to the cutter vibration motor vibrates;

then, according to the received origin coordinates of the cutting layout outputted by the visual inspection system industrial control computer, the motion controller of the multi-blade cutting system sends a control signal to servo drivers of a tool holder X-axis drive motor, a tool holder Y-axis drive motor, a tool holder Z-axis drive motor, and the cutter rotary motor to ensure that the center coordinates of the grinding wheel mesh piece to be cut are consistent with the virtual center coordinates of the cut grinding wheel mesh piece generated on the cutting layout in the visual inspection system industrial control computer;

the tool holder X-axis drive motor, the tool holder Y-axis drive motor, the tool holder Z-axis drive motor, and the cutter rotary motor cooperate to control an cutter action, and then cut the grinding wheel mesh piece on a current cutting layout of the grinding wheel mesh cloth;

in addition, output signals of rotary encoders of the tool holder X-axis drive motor, the tool holder Y-axis drive motor, the tool holder Z-axis drive motor, the cutter rotary motor, and the location adjustment motor are fed back to the motion controller of the multi-blade cutting system for closed-loop control corresponding to a cutting action; and S5: after receiving the conveying positioning end signal, the robot picking system PLC sends corresponding control signals to servo controllers of a first link arm drive motor, a second link arm drive motor, and a third link arm drive motor as well as an end effector solenoid valve of an end effector driving cylinder according to the received center coordinates of the qualified mesh piece and the center coordinates of the unqualified mesh piece outputted by the visual inspection system industrial control computer;

an end effector component performs an action of grabbing or releasing the grinding wheel mesh piece, and the first link arm drive motor, the second link arm drive motor, and the third link arm drive motor are driven by the corresponding servo controllers to start to drive the end effector component of the grinding wheel mesh piece to reciprocate between the picking section conveying belt and a mesh piece stacking stick of a stacking station to classify, pick up and stack the grinding wheel mesh piece;

in addition, output signals of rotary encoders of the first link arm drive motor, the second link arm drive motor, and the third link arm drive motor are fed back to the robot picking system PLC for closed-loop control of a picking action; and after determining that the picking action is completed, the robot picking system PLC sends the picking end signal to the conveying system PLC.

Further, an output signal of a roller encoder configured to detect a moving speed of the grinding wheel mesh cloth accesses the visual inspection system PLC, and the visual inspection system PLC controls the camera controller and the light source controller according to the output signal, and then controls a photographing speed of the line scanning camera to perform closed-loop control of a visual acquisition speed.

Further, the robot picking system PLC records picking times in a process of controlling a picking action, and compares the picking times with set picking times; if the set picking times are reached, a corresponding control signal is sent to a stacking station switching motor, and the stacking station switching motor works to drive a mesh piece stacking stick to rotate to the outside of the stacking station; and an output signal of a rotary encoder of the stacking station switching motor accesses the robot picking system PLC to perform closed-loop control of a switching action of the mesh piece stacking stick.

Advantages of the present invention are as follows:

In a process of automatic forming and picking, precise positioning of a grinding wheel mesh cloth or mesh piece is carried out on the basis of a conveying system to ensure that positioning reference of a visual inspection system, a cutting system and a picking system are highly consistent.

The visual inspection system in front of the cutting system and the picking system is used to recognize defects on the grinding wheel mesh cloth, and to establish associated origin coordinates of a cutting layout and center coordinates of the grinding wheel mesh piece; in addition, the center coordinates of the grinding wheel mesh piece are classified as qualified center coordinates or unqualified center coordinates according to a defect recognition result. The cutting system performs precise cutting based on the origin coordinates, and also ensures that center coordinates of a formed grinding wheel mesh piece are consistent with the center coordinates provided by the visual inspection system based on the precise positioning of the conveying system. On the premise of the precise positioning of the conveying system, qualified and unqualified grinding wheel mesh pieces are directly classified by the picking system according to center coordinates recognized in advance by the visual inspection system, and working references of the cutting system and the picking system are consistent with the origin coordinates of the cutting layout of the visual inspection system and the center coordinates of the grinding wheel mesh piece, and the origin coordinates of the cutting layout of the visual inspection system are fully relate with the center coordinates of the grinding wheel mesh piece.

The whole process is based on the conveying system, combined with the visual inspection system, the cutting system, and the picking system, to implement high-precision automatic logic control of cutting, picking and inspection in a manufacturing process of the grinding wheel mesh piece, which greatly reduces turnover and waiting time between processes, and has high production efficiency. Compared with final visual recognition detection of conventional products, the present invention adopts a solution of detection followed by cutting and picking. Because there is no need to recognize the grinding wheel mesh piece after cutting, the impact of a contour and an inner hole of the grinding wheel mesh piece on recognition is reduced, the detection accuracy is higher, a workload of the visual inspection system can be reduced, the setting quantity of the line scanning cameras can be reduced, and the cost can be reduced.

DETAILED DESCRIPTION

Figure 1:
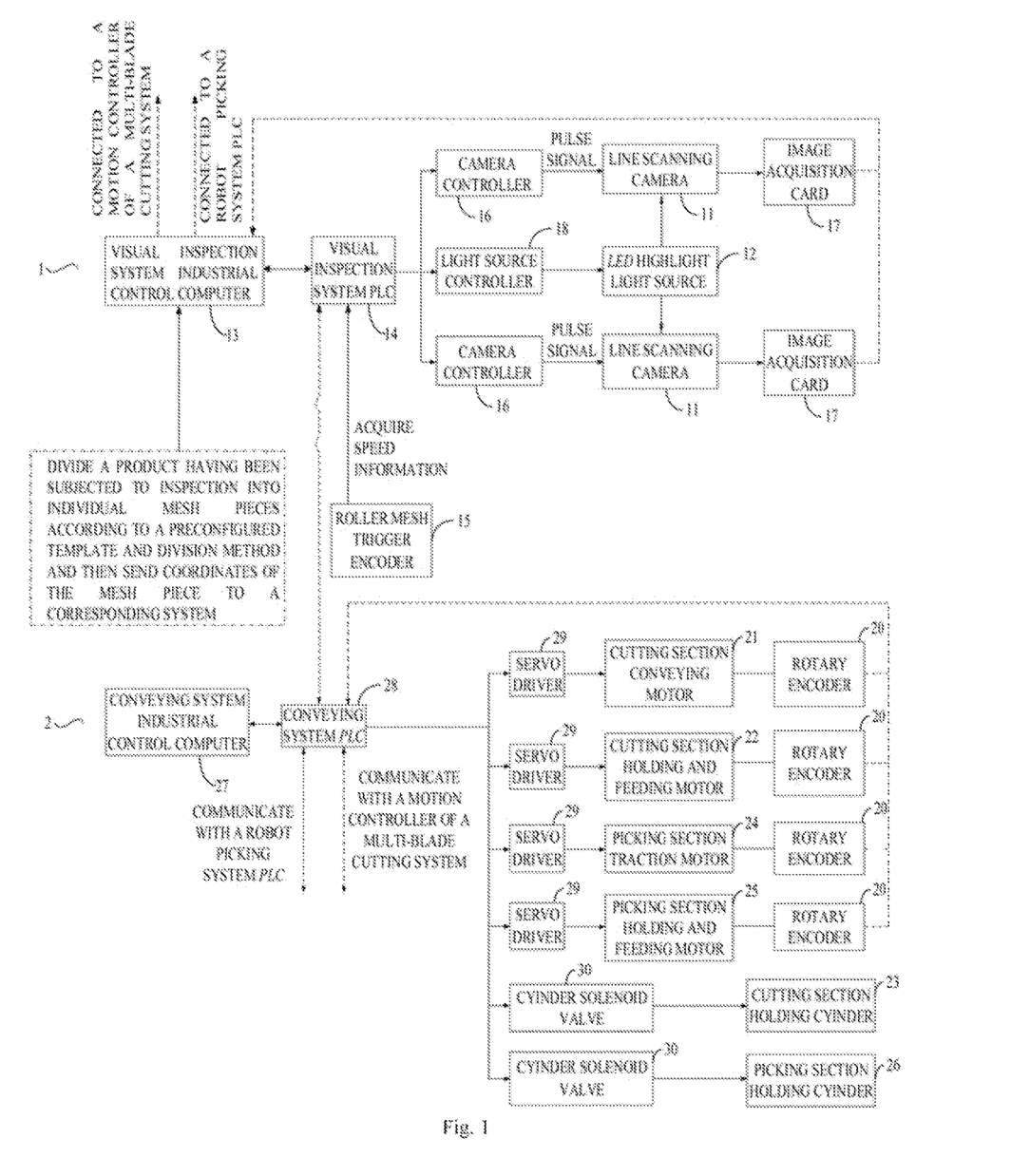
FIG. 1 is a schematic diagram of a hardware connection between a visual inspection system and a conveying system of an integrated system for cutting, picking and inspection of a grinding wheel mesh piece consistent with the present invention.
Figure 2:
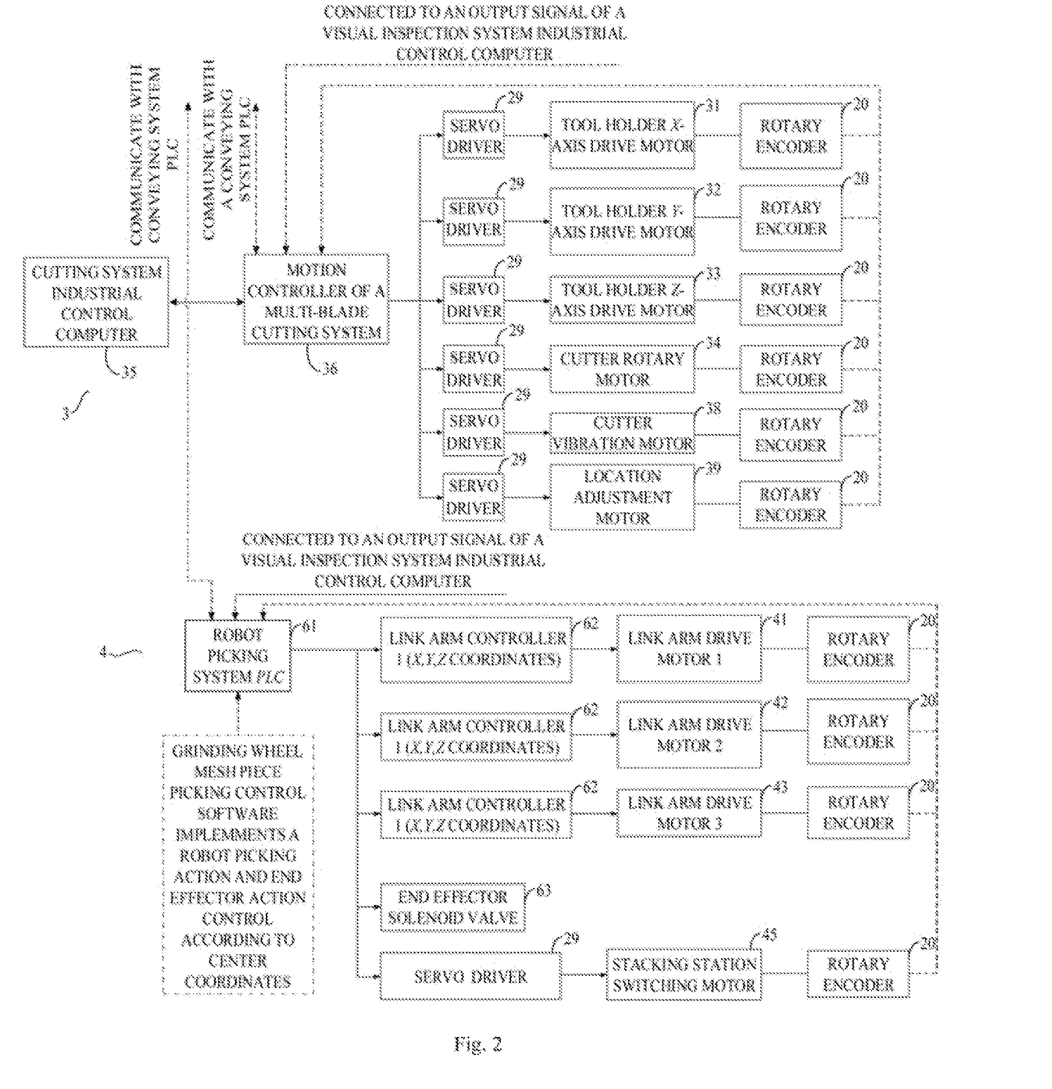
FIG. 2 is a schematic diagram of a hardware connection between a cutting system 3 and a picking system of the integrated system for cutting, picking and inspection of a grinding wheel mesh piece consistent with the present invention.
Figure 3:
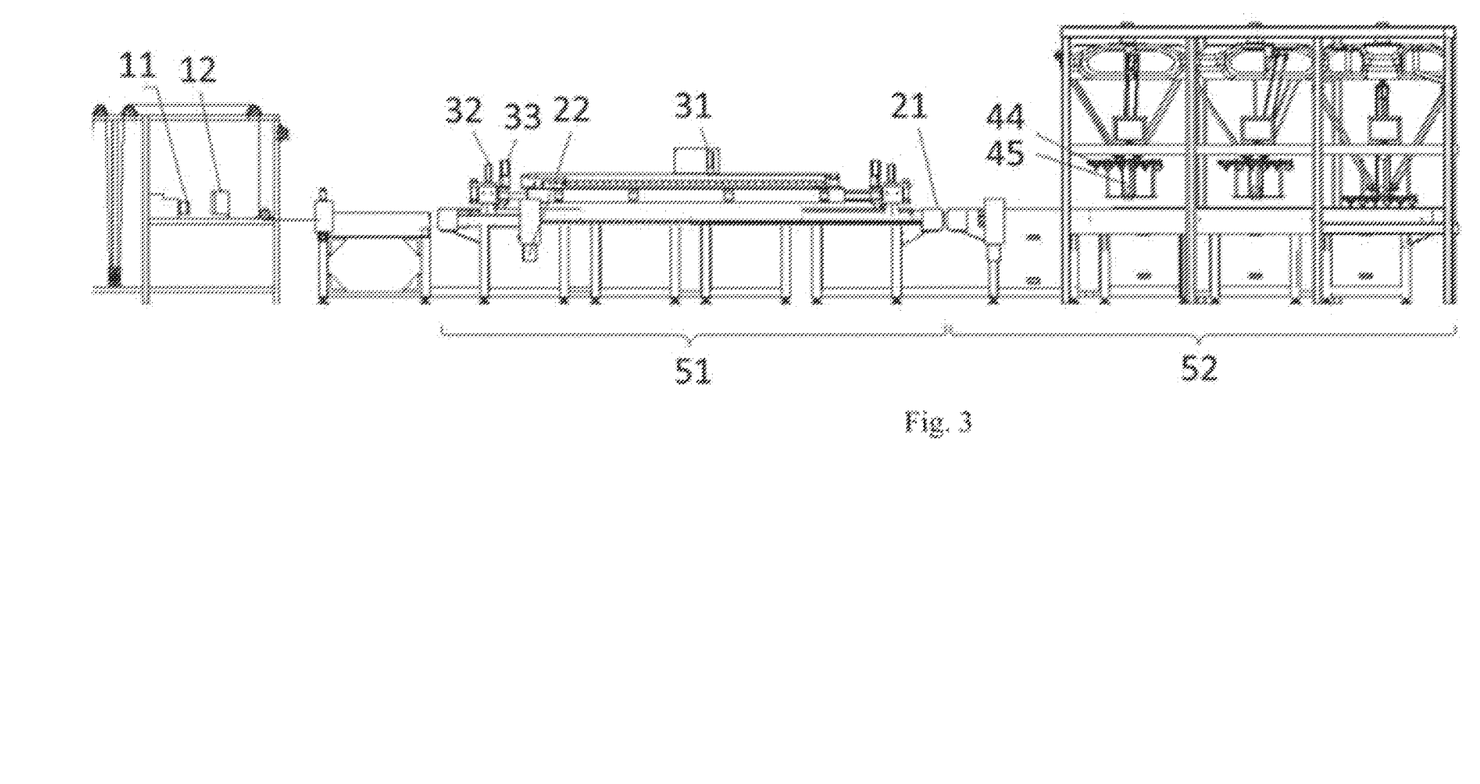
FIG. 3 is a schematic diagram of the integrated system for cutting, picking and inspection of a grinding wheel mesh piece consistent with the present invention mounted on a production line.
Figure 4:
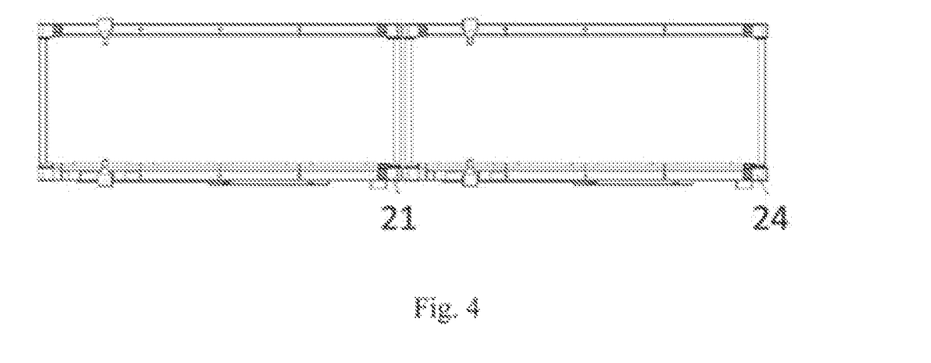
FIG. 4 is a front view of a conveying system mounted on a cutting section conveying platform and a picking section conveying platform consistent with the present invention.
Figure 5:
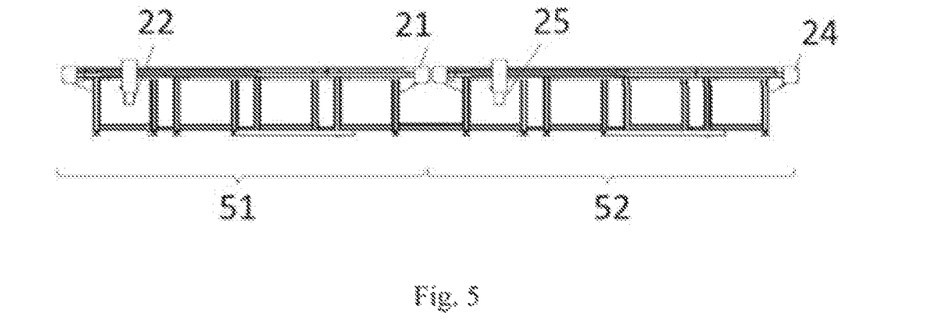
FIG. 5 is a top view of a conveying system mounted on a cutting section conveying platform and a picking section conveying platform consistent with the present invention.
Figure 6:
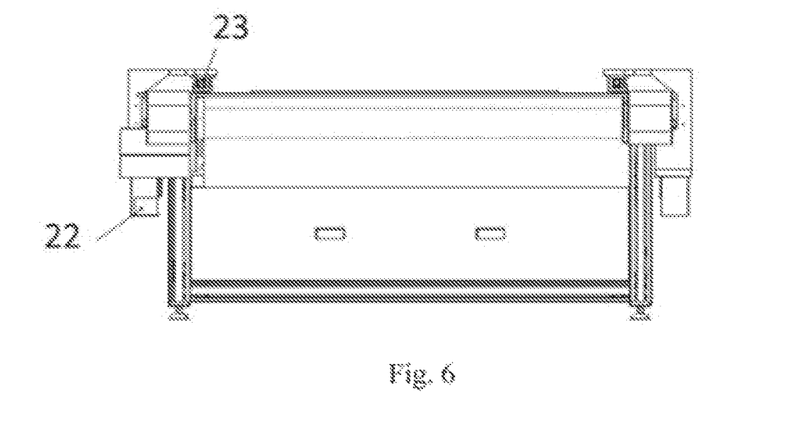
FIG. 6 is a left side view of a conveying system mounted on a cutting section conveying platform and a picking section conveying platform consistent with the present invention.
Figure 7:
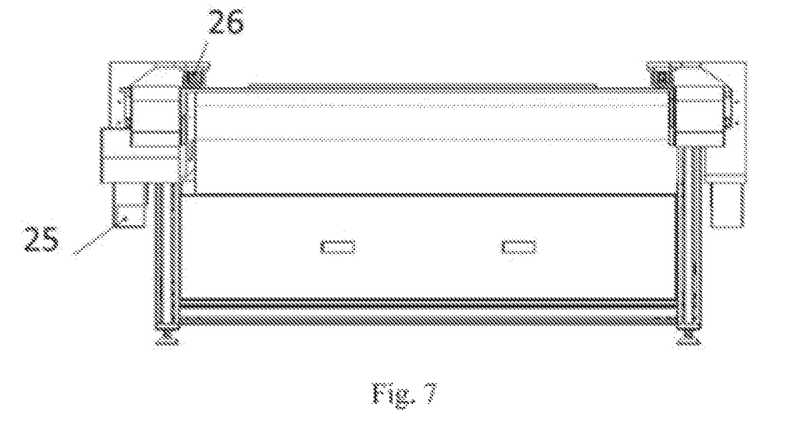
FIG. 7 is a right side view of a conveying system mounted on a cutting section conveying platform and a picking section conveying platform consistent with the present invention.

The integrated system for cutting, picking and inspection of a grinding wheel mesh piece consistent with the present invention, as shown in FIG. 1, FIG. 2, and FIG. 3, the integrated system includes a visual inspection system (1), a conveying system (2), a cutting system (3), and a picking system (4), which are mounted on an integrated production line for cutting, picking and inspection of a grinding wheel mesh piece. The production line includes at least one cutting section conveying platform (51) and at least one picking section conveying platform (52) which are sequentially arranged from a feeding side to a discharging side along a conveying direction, with a cutting device (53) being mounted above the cutting section conveying platform (51), a picking device (54) being mounted above the picking section conveying platform (52).

The visual inspection system (1) is used to acquire an image of a grinding wheel mesh cloth, establish virtual origin coordinates of a cutting layout and center coordinates of the grinding wheel mesh piece after cutting, recognize defects of the grinding wheel mesh cloth, and calibrate qualified center coordinates and unqualified center coordinates. The origin coordinates are sent to a motion controller of a multi-blade cutting system (36), the center coordinates of the qualified mesh and the center coordinates of the unqualified mesh are sent to a robot picking system PLC (61).

The vision inspection system (1) includes a visual inspection system industrial control computer (13), a vision inspection system PLC (14), a line scanning camera (11), a camera controller 16, an image acquisition card (17), an LED light source (12), a light source controller (18), and a roller encoder (15), wherein the line scanning camera (11) and the LED light source (12) are disposed in front of the cutting section conveying platform, and are used for image scanning of the grinding wheel mesh cloth in an environment with sufficient light. The roller encoder (15) is mounted on the production line where a moving speed of the grinding wheel mesh cloth can be detected, and is used to detect the moving speed of the grinding wheel mesh cloth.

The visual inspection system industrial control computer (13) communicates with the visual inspection system PLC (14), which is provided with built-in template grid software and visual defect recognition software. The visual inspection system PLC (14) is used to control turn-on and turn-off actions of the line scanning camera (11) and the LED light source 12 through the camera controller 16 and the light source controller (18). A control signal output end of the visual inspection system PLC (14) accesses the camera controller (16) and the light source controller (18), the camera controller (16) and the light source controller (18) respectively control turn-on and turn-off of the line scanning camera (11) and the LED light source (12), and the image acquisition card (17) connected to the line scanning camera (11) accesses the visual inspection system industrial control computer (13) through an image transmission bus to transmit acquired image data to the visual inspection system industrial control computer (13). An output signal of the roller encoder (15) accesses the visual inspection system PLC (14).

The conveying system (2) is used to precisely control a conveying action of the cutting section conveying platform and the picking section conveying platform.

The conveying system (2) includes a conveying system industrial control computer (27), a conveying system PLC (28), a cutting section conveying motor (21), a cutting section holding and feeding motor (22), a cutting section holding cylinder (23), a picking section conveying motor (24), a picking section holding and feeding motor (25), and a picking section holding cylinder (26).

As shown in FIG. 3 to FIG. 7, the cutting section conveying motor (21) is mounted on a conveying roller of the cutting section conveying platform (51) to drive a cutting section conveying belt to move in a horizontal direction.

The cutting section holding and feeding motor (22) and the cutting section holding cylinder (23) are mounted on both sides of the cutting section conveying belt, the cutting section holding cylinder (23) is used to hold a side of the cutting section conveying belt, and the cutting section holding and feeding motor (22) is used to drive the cutting section holding cylinder (23) and the cutting section conveying belt to move synchronously.

The picking section conveying motor (24) is mounted on a conveying roller of the picking section conveying platform, and is used to drive a picking section conveying belt to move in the horizontal direction.

The picking section holding and feeding motor (25) and the picking section holding cylinder (26) are mounted on both sides of the picking section conveying belt, the picking section holding cylinder (26) is used to hold a side of the picking section conveying belt, and the picking section holding and feeding motor (25) is used to drive the picking section holding cylinder (26) and the picking section conveying belt to move synchronously.

The cutting section conveying motor (21), the cutting section holding and feeding motor (22), the picking section conveying motor (24), and the picking section holding and feeding motor (25) are respectively equipped with independent servo drivers (29) and rotary encoders (20). Cylinder solenoid valves (30) are disposed on control air circuits of the cutting section holding cylinder (23) and the picking section holding cylinder (26), and turn-on and turn-off of the cutting section holding cylinder (23) and the picking section holding cylinder (26) is controlled by the cylinder solenoid valves (30).

In the conveying system (2), the conveying system industrial control computer (27) communicates with the conveying system PLC (28), a control signal output end of the conveying system PLC (28) accesses the servo drivers (29) of the cutting section conveying motor (21), the cutting section holding and feeding motor (22), the picking section conveying motor (24), and the picking section holding and feeding motor (25) as well as the cylinder solenoid valves (30) of the cutting section holding cylinder (23) and the picking section holding cylinder (26), and output signals of the rotary encoders (20) of the cutting section conveying motor (21), the cutting section holding and feeding motor (22), the picking section conveying motor (24), and the picking section holding and feeding motor (25) access the conveying system PLC (28).

The cutting system (3) is used to cut the grinding wheel mesh cloth moved to the cutting section conveying platform of the production line to obtain a circular grinding wheel mesh piece.

The cutting system (3) includes a cutting system industrial control computer (35), a motion controller of a multi-blade cutting system (36), a tool holder X-axis drive motor (31), a tool holder Y-axis drive motor (32), a tool holder Z-axis drive motor (33), a cutter rotary motor (34), a location adjustment motor, and a cutter vibration motor (38), wherein the tool holder X-axis drive motor, the tool holder Y-axis drive motor, the tool holder Z-axis drive motor, the cutter rotary motor, and the location adjustment motor 39 are all equipped with independent servo drivers (29) and rotary encoders (20), respectively, and the cutter vibration motor (38) is equipped with a servo driver (29).

Figure 8:
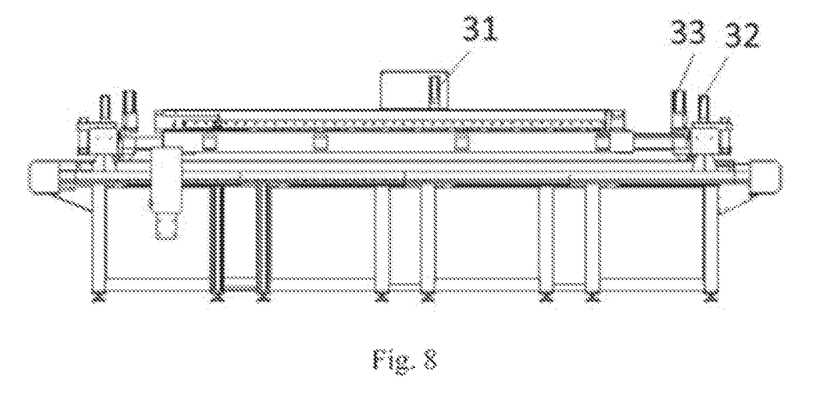
FIG. 8 is a front view of a cutting device mounted with a cutting system disposed on a cutting section conveying platform consistent with the present invention.
Figure 9:
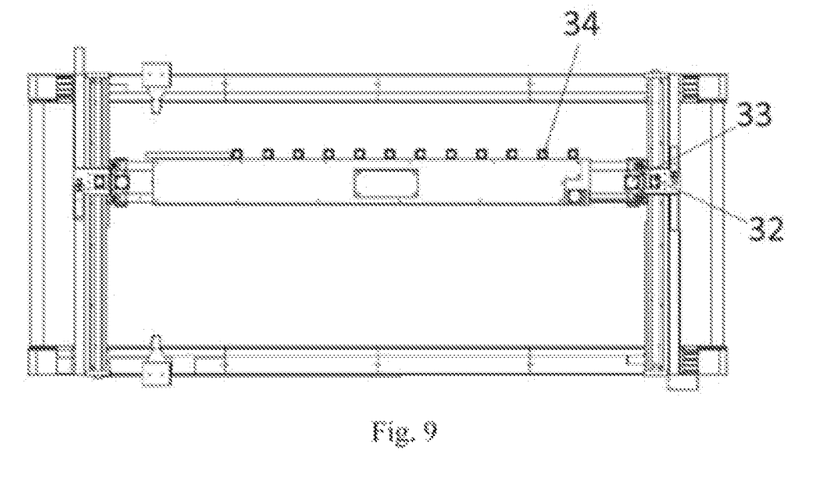
FIG. 9 is a top view of a cutting device mounted with a cutting system disposed on a cutting section conveying platform consistent with the present invention.

As shown in FIG. 8 and FIG. 9, the tool holder X-axis drive motor (31), the tool holder Y-axis drive motor (32), the tool holder Z-axis drive motor (33), the cutter rotary motor (34), the location adjustment motor (39) and the cutter vibration motor (38) are all mounted on a tool holder of the cutting device, and the tool holder spans above the cutting section conveying platform (51).

The tool holder X-axis drive motor 31, the tool holder Y-axis drive motor (32), and the tool holder Z-axis drive motor (33) are used to drive the tool holder to move in a three-dimensional direction through a screw drive pair.

The location adjustment motor (39) is used to drive each cutters on the tool holder to move in the horizontal direction to adjust a spacing in the horizontal direction of the cutters.

The cutter rotary motor (34) is used to drive the cutter to rotate, so that a cutting edge of the cutter can be tangent to a contour of the grinding wheel mesh piece to be cut in a cutting process.

The cutter vibration motor (38) is used to drive the cutter to vibrate to implement vibrating cutting.

The cutting system industrial control computer (35) communicates with the motion controller of the multi-blade cutting system (36); a control signal output end of the motion controller of the multi-blade cutting system (36) accesses the servo drivers (29) of the tool holder X-axis drive motor, the tool holder Y-axis drive motor, the tool holder Z-axis drive motor, the cutter rotary motor, the location adjustment motor (39), and the cutter vibration motor (38); and output signals of the rotary encoders (20) of the X-axis drive motor, the tool holder Y-axis drive motor, the tool holder Z-axis drive motor, the cutter rotary motor, and the location adjustment motor (39) access the motion controller of the multi-blade cutting system (36).

The picking system 4 is used to classify and pick up grinding wheel mesh piece moved to the picking section conveying platform (52) according to the qualified grinding wheel mesh piece and unqualified grinding wheel mesh piece, and stack the grinding wheel mesh piece to a stacking station of the production line.

The picking system (4) includes a robot picking system PLC (61), a first link arm drive motor (41), a second link arm drive motor (42), a third link arm drive motor (43), an end effector drive cylinder (44), and a stacking station switching motor (45), wherein the first link arm drive motor (41), the second link arm drive motor (42), the third link arm drive motor (43), and the stacking station switching motor (45) are all equipped with servo controllers (or named link arm controller 1 (X, Y, Z coordinates) 62) and rotary encoders (20), and an end effector solenoid valve (63) is disposed on a control air circuit of the end effector driving cylinder.

Figure 10:
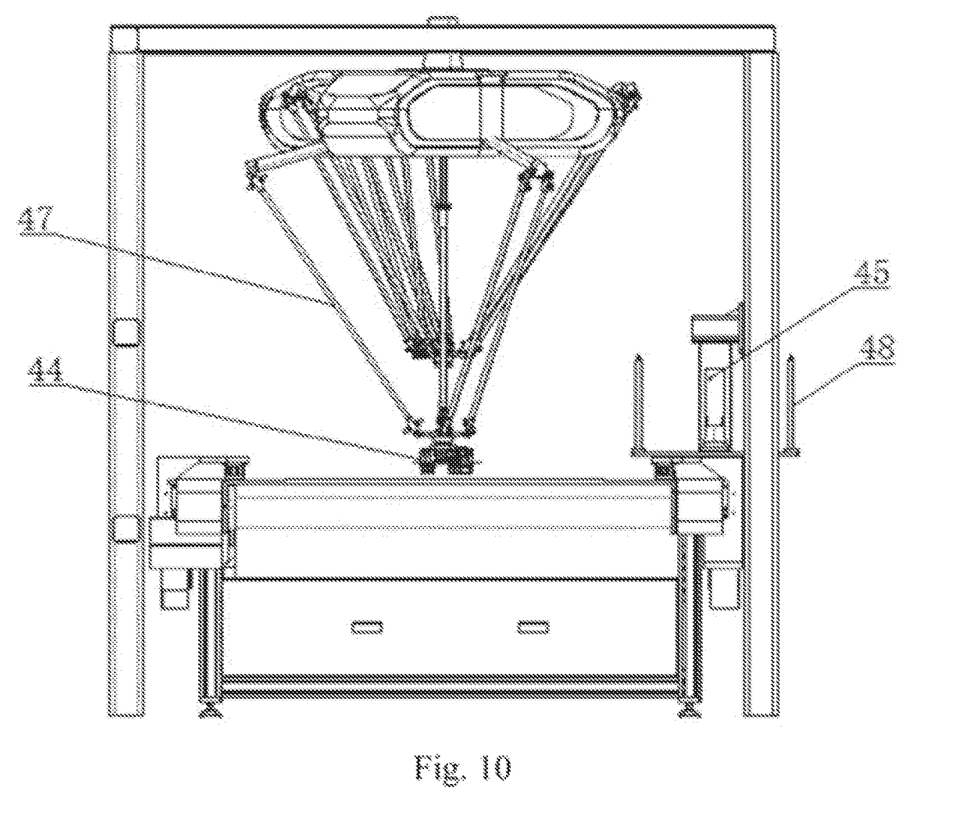
FIG. 10 is a side view of a picking device mounted with a picking system disposed on a picking section conveying platform consistent with the present invention.
Figure 11:
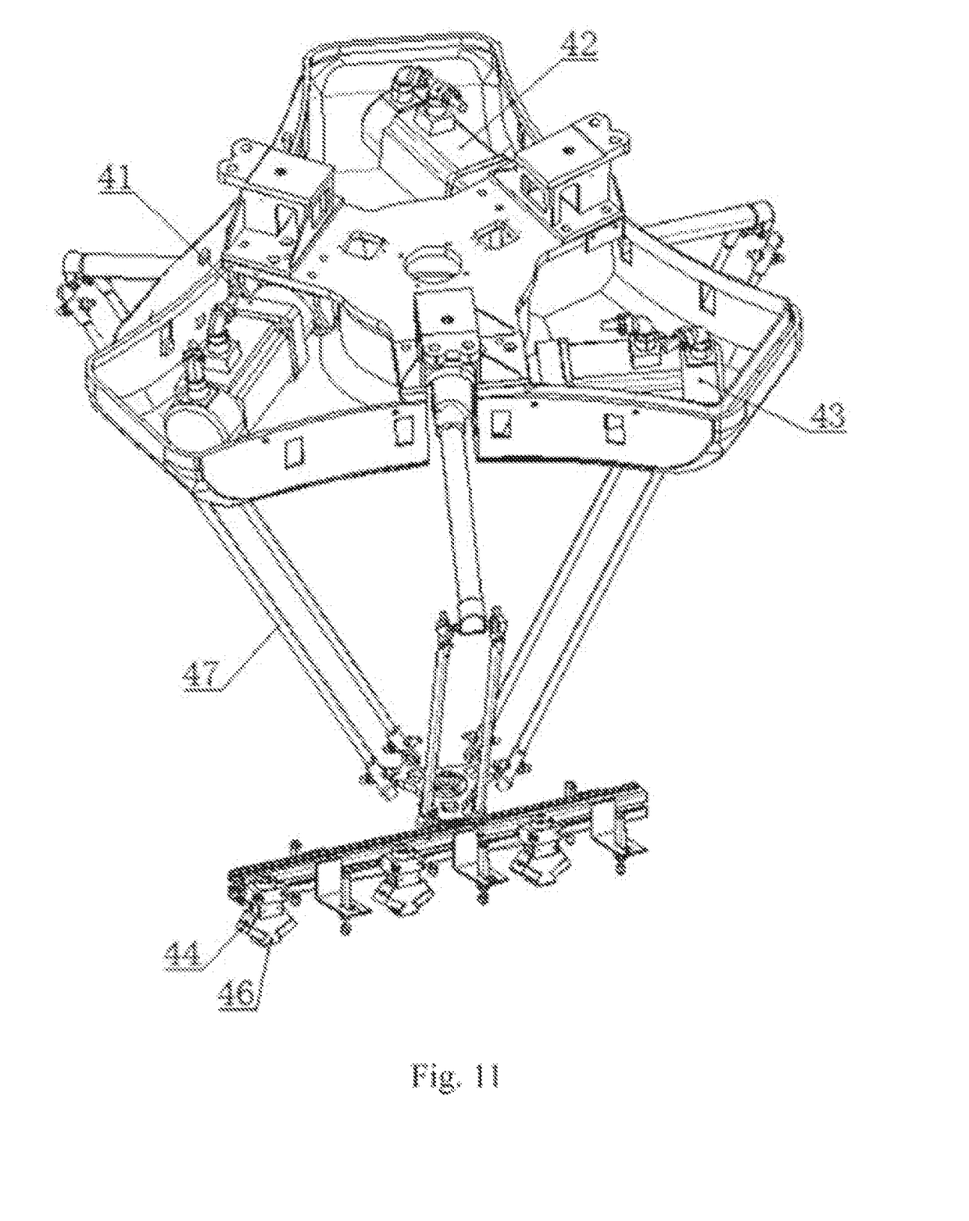
FIG. 11 is a schematic structural diagram of a picking device mounted with a part of a picking system consistent with the present invention.

As shown in FIG. 10 and FIG. 11, the end effector driving cylinder (44) is used to drive a mesh piece picker (46) to move, so as to grasp and put down the grinding wheel mesh piece.

The first link arm drive motor (41), the second link arm drive motor (42), and the third link arm drive motor (43) are used for rotation by a certain angle, and cooperate with each other to drive a mesh piece picker at a lower end of a link arm (47) to move between locations on an upper surface of the picking section conveying platform (52) and the stacking station of the production line.

The stacking station switching motor (45) is used to drive a mesh piece acquisition stick (48) on the stacking station on a side of the picking section conveying platform (52) of the production line to rotate, so that the mesh piece acquisition stick (48) is moved inside and outside the stacking station.

A control signal output end of the robot picking system PLC (61) accesses the servo controllers of the first link arm drive motor (41), the second link arm drive motor (42), the third link arm drive motor (43) and the stacking station switching motor (45) as well as the end effector solenoid valve (63) of the end effector drive cylinder (44). Output signals of the rotary encoders (20) of the first link arm drive motor (41), the second link arm drive motor (42), the third link arm drive motor (43), and the stacking station switching motor 45 access the robot picking system PLC (61).

An output signal of the visual inspection system industrial control computer (13) accesses the motion controller of the multi-blade cutting system (36) and the robot picking system PLC (61), an output signal of the conveying system PLC (28) accesses the visual inspection system PLC (14), and the conveying system PLC (28), the motion controller of the multi-blade cutting system (36), and the robot picking system PLC (61) communicate with each other.

In the present invention, the method using an integrated system for cutting, picking and inspection of a grinding wheel mesh piece is as follows:

S1: a visual inspection system industrial control computer (13), a conveying system industrial control computer (27) and a cutting system industrial control computer (35) retrieve cutting pattern layout information of a grinding wheel mesh piece, wherein the cutting pattern layout information includes a width of a grinding wheel mesh cloth and an inner diameter, an outer diameter and spacing data of the grinding wheel mesh piece;

S2: the conveying system industrial control computer (27) sends the retrieved cutting pattern layout information of the grinding wheel mesh piece to a conveying system PLC (28);

the conveying system PLC (28) detects whether a conveying start signal of the conveying system industrial control computer (27), a cutting end signal of a motion controller of a multi-blade cutting system (36), and a picking end signal of a robot picking system PLC (61) are received; if the conveying system PLC (28) receives the conveying start signal or simultaneously receives the cutting end signal of the motion controller of the multi-blade cutting system 36 and the picking end signal of the robot picking system PLC (61), the conveying system PLC (28) selects a corresponding conveying speed, a conveying interval and a conveying location according to the received cutting pattern layout information of the grinding wheel mesh piece, and sends a corresponding control signal to servo drivers (29) of a cutting section conveying motor (21), a cutting section holding and feeding motor (22), a picking section conveying motor (24), and a picking section holding and feeding motor (25) as well as cylinder solenoid valves (30) of a cutting section holding cylinder (23) and a picking section holding cylinder (26);

the cutting section holding cylinder (23) and the picking section holding cylinder (26) hold a cutting section conveying belt and a picking section conveying belt, meanwhile, the cutting section conveying motor (21), the picking section conveying motor (24), the cutting section holding and feeding motor (22), and the picking section holding and feeding motor (25) are driven by the corresponding servo drivers (29), and jointly drive the cutting section conveying belt and the picking section conveying belt to move along a conveying direction according to a set speed and an interval time to convey the grinding wheel mesh cloth or the grinding wheel mesh piece;

in addition, rotary encoders (20) corresponding to the cutting section conveying motor (21), the picking section conveying motor (24), the cutting section holding and feeding motor (22), and the picking section holding and feeding motor (25) feed back location signals to the conveying system PLC (28) for closed-loop positioning control;

after receiving a feedback signal from the rotary encoder (20) of the cutting section conveying motor (21), the conveying system PLC (28) sends a visual inspection system startup signal to the visual inspection system PLC (14);

when determining that the received positioning signal is in place, the conveying system PLC (28) sends a conveying positioning end signal to the motion controller of the multi-blade cutting system (36) and the robot picking system PLC (61);

S3:

the visual inspection system industrial control computer (13) sends the retrieved cutting pattern layout information of the grinding wheel mesh piece to the visual inspection system PLC (14);

after receiving a start signal of a visual inspection system (1), the visual inspection system PLC (14) sends a corresponding photographing control signal to a corresponding camera controller (16) and light source controller (18), a line scanning camera (11) and an LED light source (12) are turned on to photograph an image of the grinding wheel mesh cloth, and an image acquisition card (17) of the line scanning camera (11) sends acquired image information to the visual inspection system industrial control computer (13) through an image transmission bus;

an output signal of a roller encoder (15) configured to detect a moving speed of the grinding wheel mesh cloth accesses the visual inspection system PLC (14), and the visual inspection system PLC (14) controls the camera controller (16) and the light source controller (18) according to the output signal, and then controls a photographing speed of the line scanning camera (11) to perform closed-loop control of a visual acquisition speed.

after receiving the acquired image information, the visual inspection system industrial control computer 13 generates a cutting layout and origin coordinates thereof on the grinding wheel mesh cloth at a current location, generates virtual center coordinates of a cut grinding wheel mesh piece on the cutting layout according to cutting pattern layout information of the grinding wheel mesh piece and built-in template grid software, and sends the origin coordinates to the motion controller of the multi-blade cutting system (36);

in addition, the visual inspection system industrial control computer (13) performs defect recognition on the cutting layout according to built-in visual defect recognition software, then calibrates, after obtaining defect coordinates, categories of the defect coordinates, and determines the quantity of defects and categories of the defects in a grinding wheel mesh piece region corresponding to the virtual center coordinates of each grinding wheel mesh piece according to the defect coordinates; then calibrates the virtual center coordinates of each grinding wheel mesh piece as center coordinates of a qualified mesh piece or center coordinates of an unqualified mesh piece according to a determining rule of the visual defect recognition software; and sends the center coordinates of the qualified mesh piece and the center coordinates of the unqualified mesh piece to the robot picking system PLC (61).

In the present invention, after performing defect recognition on the cutting layout, the visual inspection system industrial control computer (13) simultaneously classifies and calibrates defect coordinates, and performs report functions such as classifying, counting, and statistics on the defects. The table below shows names and standards of the defects of the grinding wheel mesh piece:

| Number | Defect name | Defect feature | Degree of defect | Major defect | Minor defect |
|---|---|---|---|---|---|
| 1 | Blinded hole | A reinforcing mesh hole is blocked by cured adhesive. | 1) Warp and weft density <8 and a diameter of a reinforcing mesh ≤200 mm, and concentration or dispersion <5 per piece | Yes | |
| | | | 2) Warp and weft density <8 and a diameter of a reinforcing mesh ≤200 mm, and concentration or dispersion ≥5 per piece | Yes | |
| | | | 3) Warp and weft density <8 and a diameter of a reinforcing mesh >200 mm, and concentration or dispersion <10 per piece | Yes | |
| | | | 4) Warp and weft density <8 and a diameter of a reinforcing mesh >200 mm, and concentration or dispersion ≥10 per piece | Yes | |
| | | | 5) Warp and weft density ≥8 and a diameter of a reinforcing mesh ≤200 mm, and concentration or dispersion <10 per piece | Yes | |
| | | | 6) Warp and weft density ≥8 and a diameter of a reinforcing mesh ≤200 mm, and concentration or dispersion ≥10 per piece | Yes | |
| | | | 7) Warp and weft density ≥8 and a diameter of a reinforcing mesh >200 mm, and concentration or dispersion is <20 per piece | Yes | |
| | | | 8) Warp and weft density ≥8 and a diameter of a reinforcing mesh >200 mm, and concentration or dispersion ≥20 per piece | Yes | |
| 2 | Glue scar, Foreign object | There is excess cured adhesive attached to a reinforcing mesh, resulting in uneven gluing of a mesh piece. | | Yes | |
| 3 | Askew | Warp and weft yarns deviate from an original location as a whole | 1) A reinforcing mesh diameter ≤200 mm, >5 mm | Yes | |
| | | | 2) A reinforcing mesh diameter >200 mm, >1 cm | Yes | |
| 4 | Displacement | A single warp or weft yarn deviates from an original location | >5 mm or no gap between yarns | Yes | |
| 5 | Yarn knot | | Fluff or a yarn knot on warp and weft yarns | Yes | |
| 6 | Wool yarn | Loose strand | 1) An outer diameter of a reinforcing mesh ≤200 mm, and a length of a wool yarn ≤2 cm | | Yes |
| | | | 2) An outer diameter of a reinforcing mesh ≤200 mm, and a length of a wool yarn >2 cm | Yes | |
| | | | 3) An outer diameter of a reinforcing mesh >200 mm, and a length of a wool yarn <5 cm | | Yes |
| | | | 4) An outer diameter of a reinforcing mesh >200 mm, and a length of a wool yarn ≥5 cm | Yes | |
| 7 | Crease or white stain | Generated due to folding or collision | 1) An outer diameter of a reinforcing mesh ≤200 mm, and a length of a crease <2 cm | Yes | |
| | | | 2) An outer diameter of a reinforcing mesh ≤200 mm, and a length of a crease ≥2 cm | Yes | |
| | | | 3) An outer diameter of a reinforcing mesh >200 mm, and a length of a crease <5 cm | Yes | |
| | | | 4) An outer diameter of a reinforcing mesh >200 mm, and a length of a crease ≥5 cm | Yes | |
| 8 | Chromatic aberration | A color of the same reinforcing mesh or the same batch of reinforcing meshes is obviously uneven | | Yes | |
| 9 | Burr | A resin peels off an outer edge of a reinforcing mesh or an edge of an inner hole, causing a fiberglass yarn to become loose | | Yes | |
| 10 | Warp yarn breakage, Weft yarn breakage | Warp yarn or weft yarn breakage | | Yes | |
| 11 | Missing warp yarn, Missing weft | Missing warp yarn or weft yarn | | Yes | |

| Number | Defect name | Defect feature | Degree of defect | Major defect | Minor defect |
|---|---|---|---|---|---|
| | yarn | | | | |
| 12 | Double weft yarns | Tension of warp yarns is uneven, and there is more than one weft yarn | | Yes | |
| 13 | Glue Knot | 1) An outer diameter of a reinforcing mesh ≤200 mm, and a length of a wool yarn <2 cm | | | Yes |
| | | 2) An outer diameter of a reinforcing mesh ≤200 mm, and a length of a wool yarn ≥2 cm | | Yes | |
| | | 3) An outer diameter of a reinforcing mesh >200 mm, and a length of a wool yarn <5 cm | | | Yes |
| | | 4) An outer diameter of a reinforcing mesh >200 mm, and a length of a wool yarn ≥5 cm | | Yes | |
| 14 | Hole | Weft yarns are broken at the same time | | Yes | |
| 15 | Not round, Missing edge | A mesh piece is not round or an edge is chipped | | Yes | |
| 16 | Motion mark | There is one extra yarn within 25 mm in a warp direction | | Yes | |
| | | There is more than one extra yarn within 25 mm in a weft direction | | Yes | |
| | | There is one or more missing yarn within 25 mm in a warp direction | | Yes | |

Two minor defects accumulated are merged into one major defect, and a single virtual grinding wheel mesh with two major defects accumulated is unqualified. Center coordinates of the grinding wheel mesh piece with two major defects accumulated are calibrated as unqualified mesh piece center coordinates, and the rest are calibrated as qualified mesh piece center coordinates.

S4: The cutting system industrial control computer (35) sends the retrieved cutting pattern layout information of the grinding wheel mesh piece to the motion controller of the multi-blade cutting system (36);

after receiving the conveying positioning end signal, the motion controller of the multi-blade cutting system (36) first selects a corresponding cutter parameter according to the cutting pattern layout information of the grinding wheel mesh piece, sends a corresponding control signal to servo drivers (29) corresponding to the location adjustment motor (39) and the cutter vibration motor (38), starts the location adjustment motor (39) to adjust a distance between adjacent cutters, and controls whether each cutter corresponding to the cutter vibration motor (38) vibrates;

then, according to the received origin coordinates of the cutting layout outputted by the visual inspection system industrial control computer (13), the motion controller of the multi-blade cutting system (36) sends a control signal to servo drivers (29) of a tool holder X-axis drive motor, a tool holder Y-axis drive motor, a tool holder Z-axis drive motor, and the cutter rotary motor to ensure that the center coordinates of the grinding wheel mesh piece to be cut are consistent with the virtual center coordinates of the cut grinding wheel mesh piece generated on the cutting layout in the visual inspection system industrial control computer (13);

the tool holder X-axis drive motor, the tool holder Y-axis drive motor, the tool holder Z-axis drive motor, and the cutter rotary motor cooperate to control an cutter action, and then cut the grinding wheel mesh piece on a current cutting layout of the grinding wheel mesh cloth;

in addition, output signals of rotary encoders (20) of the tool holder X-axis drive motor, the tool holder Y-axis drive motor, the tool holder Z-axis drive motor, the cutter rotary motor, and the location adjustment motor (39) are fed back to the motion controller of the multi-blade cutting system (36) for closed-loop control corresponding to a cutting action; and S5:
after receiving the conveying positioning end signal, the robot picking system PLC (61) sends corresponding control signals to servo controllers of a first link arm drive motor (41), a second link arm drive motor (42), and a third link arm drive motor (43) as well as an end effector solenoid valve (63) of an end effector driving cylinder according to the received center coordinates of the qualified mesh piece and the center coordinates of the unqualified mesh piece outputted by the visual inspection system industrial control computer (13);

driven by the corresponding servo controllers to start, the first link arm drive motor (41), the second link arm drive motor (42), and the third link arm drive motor (43) first drive an end effector component to move to an upper surface of the grinding wheel mesh piece to be grasped, the end effector solenoid valve (63) is turned or off to correspondingly control whether the grinding wheel mesh piece is grasped or not grasped; then drive the end effector component to move above a mesh piece stacking stick of the stacking station, and control to put down a grabbed grinding wheel mesh piece through the turn-on and turn-off of the end effector solenoid valve (63); in this way, the end effector component of the grinding wheel mesh piece is repeatedly driven to move back and forth between the picking section conveying belt and the mesh piece stacking stick in the stacking station to implement classifying, picking and stacking of the grinding wheel mesh piece;

in addition, output signals of rotary encoders (20) of the first link arm drive motor (41), the second link arm drive motor (42), and the third link arm drive motor (43) are fed back to the robot picking system PLC (61) for closed-loop control of a picking action; and the robot picking system PLC (61) records picking times in a process of controlling a picking action, and compares the picking times with set picking times; if the set picking times are reached, a corresponding control signal is sent to a stacking station switching motor (45), and the stacking station switching motor (45) works to drive the mesh piece stacking stick to rotate to the outside of the stacking station; and an output signal of a rotary encoder (20) of the stacking station switching motor (45) accesses the robot picking system PLC (61) to perform closed-loop control of a switching action of the mesh piece stacking stick.

After determining that the picking action is completed, the robot picking system PLC (61) sends the picking end signal to the conveying system PLC (28).

What is claimed is:

1. An integrated system for cutting, picking and inspection of a grinding wheel mesh piece, is mounted on a grinding wheel mesh piece production line, wherein the production line comprises a cutting section conveying platform and a picking section conveying platform which are arranged in sequence along a conveying direction, a cutting device is mounted above the cutting section conveying platform, a picking device is mounted above the picking section conveying platform; wherein the integrated system comprises a visual inspection system, a conveying system, a cutting system, and a picking system;

the vision inspection system comprises a visual inspection system industrial control computer, a vision inspection system PLC, a line scanning camera, a camera controller, an image acquisition card, an LED light source, and a light source controller, wherein the line scanning camera and the LED light source are mounted in front of the cutting section conveying platform of the grinding wheel mesh piece production line; the visual inspection system industrial control computer is provided with built-in template grid software and visual defect recognition software; the visual inspection system industrial control computer communicates with the visual inspection system PLC, a control signal output end of the visual inspection system PLC accesses the camera controller and the light source controller, the camera controller and the light source controller respectively control turn-on and turn-off of the line scanning camera and the LED light source, and the image acquisition card connected to the line scanning camera accesses the visual inspection system industrial control computer through an image transmission bus;

the conveying system comprises a conveying system industrial control computer, a conveying system PLC, a cutting section conveying motor, a cutting section holding and feeding motor, a cutting section holding cylinder, a picking section conveying motor, a picking section holding and feeding motor, and a picking section holding cylinder, wherein the cutting section conveying motor, the cutting section holding and feeding motor, the picking section conveying motor, and the picking section holding and feeding motor are respectively equipped with independent servo drivers and rotary encoders; cylinder solenoid valves are disposed on control air circuits of the cutting section holding cylinder and the picking section holding cylinder; the cutting section conveying motor, the cutting section holding and feeding motor, the cutting section holding cylinder, the picking section conveying motor, the picking section holding and feeding motor, and the picking section holding cylinder are all mounted on the cutting device;

the conveying system industrial control computer communicates with the conveying system PLC, a control signal output end of the conveying system PLC accesses the servo drivers of the cutting section conveying motor, the cutting section holding and feeding motor, the picking section conveying motor, and the picking section holding and feeding motor as well as the cylinder solenoid valves of the cutting section holding cylinder and the picking section holding cylinder, wherein output signals of the rotary encoders of the cutting section conveying motor, the cutting section holding and feeding motor, the picking section conveying motor, and the picking section holding and feeding motor access the conveying system PLC;

the cutting system comprises a cutting system industrial control computer, a motion controller of a multi-blade cutting system, a tool holder X-axis drive motor, a tool holder Y-axis drive motor, a tool holder Z-axis drive motor, a cutter rotary motor, a location adjustment motor, and a cutter vibration motor, wherein the tool holder X-axis drive motor, the tool holder Y-axis drive motor, the tool holder Z-axis drive motor, the cutter rotary motor, and the location adjustment motor are all equipped with independent servo drivers and rotary encoders, respectively, and the cutter vibration motor is equipped with a servo driver; the tool holder X-axis drive motor, the tool holder Y-axis drive motor, the tool holder Z-axis drive motor, the cutter rotary motor, the location adjustment motor and the cutter vibration motor are mounted on the cutting device;

the cutting system industrial control computer communicates with the motion controller of the multi-blade cutting system, a control signal output end of the motion controller of the multi-blade cutting system accesses the servo drivers of the tool holder X-axis drive motor, the tool holder Y-axis drive motor, the tool holder Z-axis drive motor, the cutter rotary motor, the location adjustment motor and the cutter vibration motor; output signals of the rotary encoders of the tool holder X-axis drive motor, the tool holder Y-axis drive motor, the tool holder Z-axis drive motor, the cutter rotary motor and the location adjustment motor access the motion controller of the multi-blade cutting system;

the picking system comprises a robot picking system PLC, a first link arm drive motor, a second link arm drive motor, a third link arm drive motor, and an end effector drive cylinder, wherein the first link arm drive motor, the second link arm drive motor, and the third link arm drive motor are all equipped with servo controllers and rotary encoders, and an end effector solenoid valve is disposed on a control air circuit of the end effector driving cylinder; the first link arm drive motor, the second link arm drive motor, the third link arm drive motor, and the end effector drive cylinder are mounted on the picking device;

a control signal output end of the robot picking system PLC accesses the servo controllers of the first link arm drive motor, the second link arm drive motor, and the third link arm drive motor, as well as the end effector solenoid valve of the end effector drive cylinder; output signals of the rotary encoders of the first link arm drive motor, the second link arm drive motor, and the third link arm drive motor access the robot picking system PLC;

an output signal of the visual inspection system industrial control computer accesses the motion controller of the multi-blade cutting system and the robot picking system PLC, an output signal of the conveying system PLC accesses the visual inspection system PLC, the conveying system PLC, the motion controller of the multi-blade cutting system, and the robot picking system PLC communicate with each other.

2. The integrated system for cutting, picking and inspection of a grinding wheel mesh piece of claim 1, wherein the visual inspection system further comprises a roller encoder, and an output signal of the roller encoder accesses the visual inspection system PLC.

3. The integrated system for cutting, picking and inspection of a grinding wheel mesh piece of claim 1, wherein the picking system further comprises a stacking station switching motor equipped with a servo controller and a rotary encoder, and an output signal of the rotary encoder of the stacking station switching motor and an input signal of the servo controller of the stacking station switching motor are both connected to the robot picking system PLC.

4. A mesh piece production method using a integrated system for cutting, picking and inspection of a grinding wheel mesh piece, wherein the method comprises:

S1: a visual inspection system industrial control computer, a conveying system industrial control computer and a cutting system industrial control computer retrieve cutting pattern layout information of a grinding wheel mesh piece, wherein the cutting pattern layout information comprises a width of a grinding wheel mesh cloth and an inner diameter, an outer diameter and spacing data of the grinding wheel mesh piece;

S2: the conveying system industrial control computer sends the retrieved cutting pattern layout information of the grinding wheel mesh piece to a conveying system PLC, and the conveying system PLC detects whether a conveying start signal of the conveying system industrial control computer, a cutting end signal of a motion controller of a multi-blade cutting system, and a picking end signal of a robot picking system PLC are received; if the conveying system PLC receives the conveying start signal or simultaneously receives the cutting end signal of the motion controller of the multi-blade cutting system and the picking end signal of the robot picking system PLC, the conveying system PLC selects a corresponding conveying speed, a conveying interval and a conveying location according to the received cutting pattern layout information of the grinding wheel mesh piece, and sends a corresponding control signal to servo drivers of a cutting section conveying motor, a cutting section holding and feeding motor, a picking section conveying motor, and a picking section holding and feeding motor as well as cylinder solenoid valves of a cutting section holding cylinder and a picking section holding cylinder;

the cutting section holding cylinder and the picking section holding cylinder hold a cutting section conveying belt and a picking section conveying belt, meanwhile, the cutting section conveying motor, the picking section conveying motor, the cutting section holding and feeding motor, and the picking section holding and feeding motor are driven by the corresponding servo drivers, and jointly drive the cutting section conveying belt and the picking section conveying belt to move along a conveying direction according to a set speed and an interval time to convey the grinding wheel mesh cloth or the grinding wheel mesh piece;

in addition, rotary encoders corresponding to the cutting section conveying motor, the picking section conveying motor, the cutting section holding and feeding motor, and the picking section holding and feeding motor feed back location signals to the conveying system PLC for closed-loop positioning control;

after receiving a feedback signal from the rotary encoder of the cutting section conveying motor, the conveying system PLC sends a visual inspection system startup signal to the visual inspection system PLC;

when determining that the received positioning signal is in place, the conveying system PLC sends a conveying positioning end signal to the motion controller of the multi-blade cutting system and the robot picking system PLC;

S3: the visual inspection system industrial control computer sends the retrieved cutting pattern layout information of the grinding wheel mesh piece to the visual inspection system PLC;

after receiving a start signal of a visual inspection system, the visual inspection system PLC sends a corresponding photographing control signal to a corresponding camera controller and light source controller, a line scanning camera and an LED light source are turned on to photograph an image of the grinding wheel mesh cloth, and an image acquisition card of the line scanning camera sends acquired image information to the visual inspection system industrial control computer through an image transmission bus;

after receiving the acquired image information, the visual inspection system industrial control computer generates a cutting layout and origin coordinates thereof on the grinding wheel mesh cloth at a current location, generates virtual center coordinates of a cut grinding wheel mesh piece on the cutting layout according to cutting pattern layout information of the grinding wheel mesh piece and built-in template grid software, and sends the origin coordinates to the motion controller of the multi-blade cutting system;

in addition, the visual inspection system industrial control computer performs defect recognition on the cutting layout according to built-in visual defect recognition software, then calibrates, after obtaining defect coordinates, categories of the defect coordinates, and determines the quantity of defects and categories of the defects in a grinding wheel mesh piece region corresponding to the virtual center coordinates of each grinding wheel mesh piece according to the defect coordinates; then calibrates the virtual center coordinates of each grinding wheel mesh piece as center coordinates of a qualified mesh piece or center coordinates of an unqualified mesh piece according to a determining rule of the visual defect recognition software; and sends the center coordinates of the qualified mesh piece and the center coordinates of the unqualified mesh piece to the robot picking system PLC;

S4: the cutting system industrial control computer sends the retrieved cutting pattern layout information of the grinding wheel mesh piece to the motion controller of the multi-blade cutting system;

after receiving the conveying positioning end signal, the motion controller of the multi-blade cutting system first selects a corresponding cutter parameter according to the cutting pattern layout information of the grinding wheel mesh piece, sends a corresponding control signal to servo drivers corresponding to the location adjustment motor and the cutter vibration motor, starts the location adjustment motor to adjust a distance between adjacent cutters, and controls whether each cutter corresponding to the cutter vibration motor vibrates;

then, according to the received origin coordinates of the cutting layout outputted by the visual inspection system industrial control computer, the motion controller of the multi-blade cutting system sends a control signal to servo drivers of a tool holder X-axis drive motor, a tool holder Y-axis drive motor, a tool holder Z-axis drive motor, and the cutter rotary motor to ensure that the center coordinates of the grinding wheel mesh piece to be cut are consistent with the virtual center coordinates of the cut grinding wheel mesh piece generated on the cutting layout in the visual inspection system industrial control computer;

the tool holder X-axis drive motor, the tool holder Y-axis drive motor, the tool holder Z-axis drive motor, and the cutter rotary motor cooperate to control an cutter action, and then cut the grinding wheel mesh piece on a current cutting layout of the grinding wheel mesh cloth;

in addition, output signals of rotary encoders of the tool holder X-axis drive motor, the tool holder Y-axis drive motor, the tool holder Z-axis drive motor, the cutter rotary motor, and the location adjustment motor are fed back to the motion controller of the multi-blade cutting system for closed-loop control corresponding to a cutting action; and S5: after receiving the conveying positioning end signal, the robot picking system PLC sends corresponding control signals to servo controllers of a first link arm drive motor, a second link arm drive motor, and a third link arm drive motor as well as an end effector solenoid valve of an end effector driving cylinder according to the received center coordinates of the qualified mesh piece and the center coordinates of the unqualified mesh piece outputted by the visual inspection system industrial control computer;

an end effector component performs an action of grabbing or releasing the grinding wheel mesh piece, and the first link arm drive motor, the second link arm drive motor, and the third link arm drive motor are driven by the corresponding servo controllers to start to drive the end effector component of the grinding wheel mesh piece to reciprocate between the picking section conveying belt and a mesh piece stacking stick of a stacking station to classify, pick up and stack the grinding wheel mesh piece;

in addition, output signals of rotary encoders of the first link arm drive motor, the second link arm drive motor, and the third link arm drive motor are fed back to the robot picking system PLC for closed-loop control of a picking action; and after determining that the picking action is completed, the robot picking system PLC sends the picking end signal to the conveying system PLC.

5. The mesh piece production method using a integrated system for cutting, picking and inspection of a grinding wheel mesh piece of claim 4, wherein an output signal of a roller encoder configured to detect a moving speed of the grinding wheel mesh cloth accesses the visual inspection system PLC, and the visual inspection system PLC controls the camera controller and the light source controller according to the output signal, and then controls a photographing speed of the line scanning camera to perform closed-loop control of a visual acquisition speed.

6. The mesh piece production method using a integrated system for cutting, picking and inspection of a grinding wheel mesh piece of claim 4, wherein the robot picking system PLC records picking times in a process of controlling a picking action, and compares the picking times with set picking times; if the set picking times are reached, a corresponding control signal is sent to a stacking station switching motor, and the stacking station switching motor works to drive a mesh piece stacking stick to rotate to the outside of the stacking station; and an output signal of a rotary encoder of the stacking station switching motor accesses the robot picking system PLC to perform closed-loop control of a switching action of the mesh piece stacking stick.

* * * * *